United States Patent
Attia et al.

(10) Patent No.: US 10,941,716 B2
(45) Date of Patent: Mar. 9, 2021

(54) FAST GRID SYNCHRONIZATION

(71) Applicant: Innio Jenbacher GmbH & Co OG, Jenbach (AT)

(72) Inventors: Sid Ahmed Attia, Berlin (DE); Georg Arnold, Jenbach (AT)

(73) Assignee: Innio Jenbacher Gmbhh & Co OG, Jenbach (AT)

( * ) Notice: Subject to any disclaimer, the term of this patent is extended or adjusted under 35 U.S.C. 154(b) by 20 days.

(21) Appl. No.: 16/392,616

(22) Filed: Apr. 23, 2019

(65) Prior Publication Data
US 2019/0323439 A1    Oct. 24, 2019

(30) Foreign Application Priority Data
Apr. 24, 2018 (EP) ..................................... 18168955

(51) Int. Cl.
| | | |
|---|---|---|
| F02D 29/06 | (2006.01) | |
| F02B 63/04 | (2006.01) | |
| F02D 17/02 | (2006.01) | |
| F02D 31/00 | (2006.01) | |
| H02J 3/40 | (2006.01) | |
| H02K 7/18 | (2006.01) | |
| H02P 9/04 | (2006.01) | |
| H02P 101/25 | (2016.01) | |

(52) U.S. Cl.
CPC ............ *F02D 29/06* (2013.01); *F02B 63/042* (2013.01); *F02D 17/02* (2013.01); *F02D 31/001* (2013.01); *H02J 3/40* (2013.01); *H02K 7/1815* (2013.01); *H02P 9/04* (2013.01); *H02P 2101/25* (2015.01)

(58) Field of Classification Search
CPC ........ F02D 29/06; F02D 17/02; F02D 31/001; F02B 63/042; H02J 3/40; H02K 7/1815; H02P 9/04
USPC ............................................... 123/198 F, 481
See application file for complete search history.

(56) References Cited

U.S. PATENT DOCUMENTS

| | | | |
|---|---|---|---|
| 2012/0175876 A1* | 7/2012 | Pendray | H02P 9/04 290/41 |
| 2015/0115616 A1* | 4/2015 | Gomez | F02D 41/021 290/40 B |
| 2018/0367074 A1* | 12/2018 | Spyra | H02P 9/006 |

* cited by examiner

*Primary Examiner* — Mahmoud Gimie
(74) *Attorney, Agent, or Firm* — Fletcher Yoder, P.C.

(57) ABSTRACT

A method of operating a genset (1), wherein an internal combustion engine (2) drives a generator (3), wherein a kinematic parameter characteristic for a rotation of a rotor (13) of the generator (3) and an electrical parameter characteristic for a frequency and/or a phase of a power supply network (4) are directly or indirectly detected, wherein at least one deviation of the kinematic parameter from the electrical parameter is used in a control of the mechanical power output of the internal combustion engine (2) before or during a connecting of the generator (4) to the power supply network (4) in order to supply electrical power to the power supply network (4), wherein a control intervention for a control of the mechanical power output of the internal combustion engine (2) using the control law is
  starting to fire a plurality—preferably all—of previously unfired cylinders (11) and/or
  stopping to fire a plurality—preferably all—previously fired cylinders (11).

20 Claims, 2 Drawing Sheets

FAST GRID SYNCHRONIZATION

CROSS-REFERENCE TO RELATED APPLICATION

Figure 1:
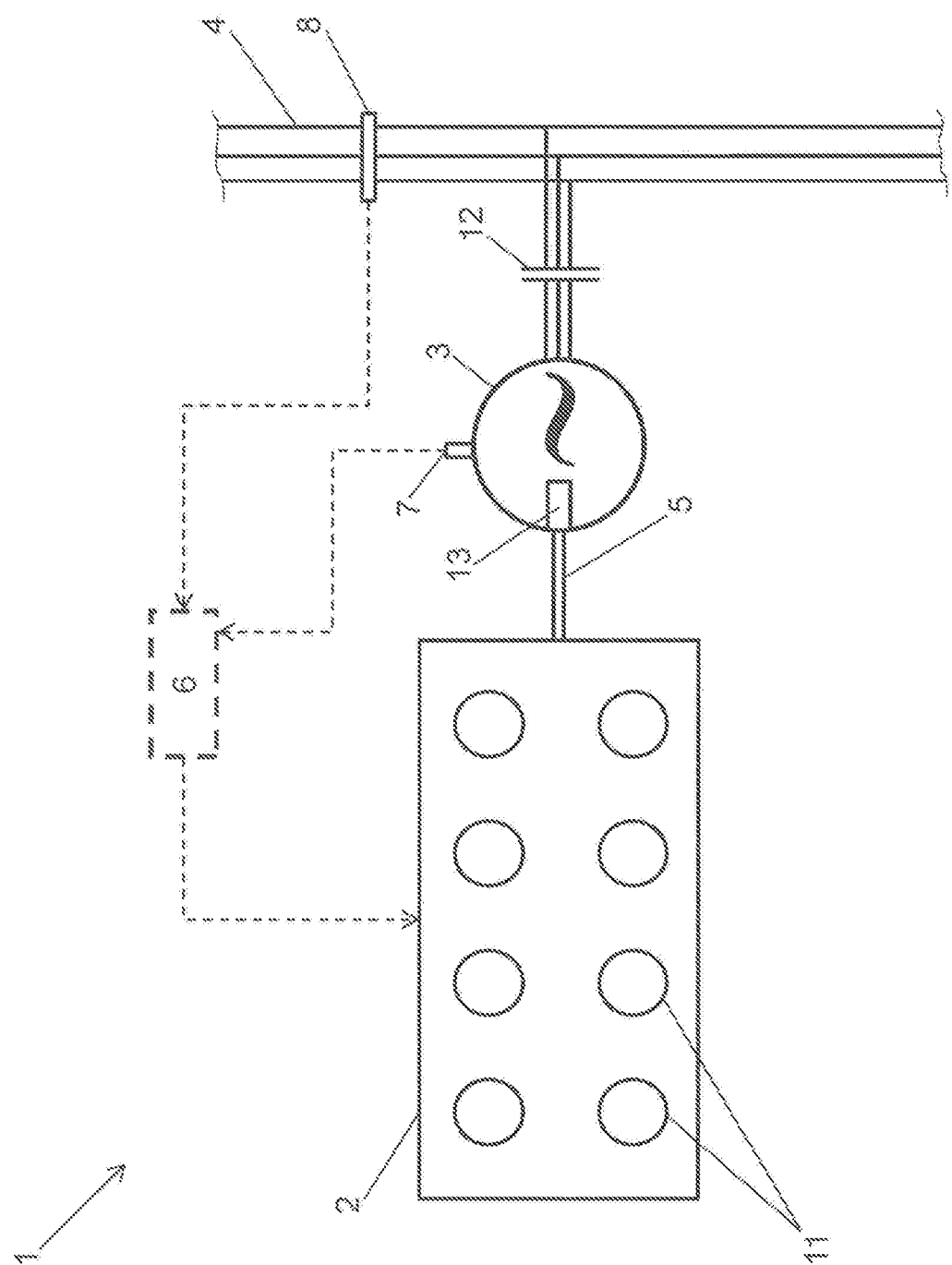

This application is a U.S. Non-Provisional Application which claims priority to European Patent Application No. EP 18 168 955.5, entitled "Fast Grid Synchronization", filed on Apr. 24, 2018.

The invention concerns a method of operating a genset, wherein an internal combustion engine drives a generator, wherein a kinematic parameter characteristic for a rotation of a rotor of the generator and an electrical parameter characteristic for a frequency and/or a phase of a power supply network are directly or indirectly detected. The invention also concerns a genset.

It is known by the state of the art that synchronization between a genset and a power supply network has to be performed before or during a genset is connected with the power supply network. Because the state of the power supply network is mostly given by the field of application, in most cases the parameters of the power supply network can not be changed to do such synchronization. As a result of these the genset has to be synchronized to the power supply network. More particularly it is known by the state of the art to control the power unit of the genset (in the present case the internal combustion engine) to synchronize the genset to the power supply network before or during a connecting operation between them.

Because gensets are mostly used to provide electrical power rapidly in cases wherein more electrical power is required by an energy supply network, it is essentially for a genset that it can be synchronized as quickly as possible.

The object of the invention is to provide a method for operating a genset and a genset which allows a fast synchronization to a power supply network before or during a connection of the genset to the power supply network.

According to the invention this object is attained by a method having the features of claim 1 and a genset having the features of claim 13.

According to the invention it is therefore provided that at least one deviation of the kinematic parameter from the electrical parameter is used in a control of the mechanical power output of the internal combustion engine before or during a connecting of the generator to the power supply network in order to supply electrical power to the power supply network. Through the control of the mechanical power output of the internal combustion engine taking into account the deviation of the kinematic parameter from the electrical parameter the amount of time needed for the connecting operation can be significantly reduced. Further it is provided that a control intervention for a control of the mechanical power output of the internal combustion engine using the control law is

- starting to fire a plurality—preferably all—of previously unfired cylinders and/or
- stopping to fire a plurality—preferably all—previously fired cylinders.

In connection of the invention the expression "before or during a connection of the generator to the power supply network to supply electrical power to the power supply network" means that the genset is controlled by the above described method till a connection between the generator and the power supply network is established and electrical power is transferred to the power supply network. After the connection is established and the genset delivers electrical power to the power supply network the genset can be controlled by known methods.

Advantageous configurations of the invention are recited in the dependent claims.

In that way it can be provided that if the deviation between kinematic parameter and electrical parameter is large a plurality of cylinders (which are previously not fired) are started to be fired. This increases the mechanical power output of the internal combustion engine driving the generator, whereby the deviation will be increased.

This allows for a control of the power of the internal combustion engine without making compromises with regard to optimal operation parameters for fired cylinders.

On the other hand it can be provided—for example—that if the deviation between kinematic parameter and electrical parameter is large a plurality of cylinders (which are previously fired) are skipped. This decreases the mechanical power output of the internal combustion engine driving the generator, whereby the deviation will be decreased.

The number of skipped or fired cylinders can—for example—depend on the deviation: the higher the deviation, the more cylinders can be skipped or fired. An advantage of skipping or firing of previously not skipped or not fired cylinders, respectively, is a very short reaction time.

A further parameter which can be used for determining the number of skipped cylinders could for example be the temperature of the internal combustion engine. If the internal combustion engine is "cold" it might be relatively sluggish and a higher number of skipped cylinders can be elected in contrast to a "hot" internal combustion engine (for this example a "hot" internal combustion engine can be understood as an internal combustion engine having operation temperature and a "cold" internal combustion engine can be understood as an internal combustion engine having a temperature below the operation temperature).

If a prompt reaction is required it can for example be provided that all previously fired or not fired cylinders are skipped or fired, respectively.

This starting to fire or skipping of a plurality of cylinders can for example be done by a deactivation or an activation of the ignition of said cylinders. Alternatively or additionally it can be provided that the starting to tire or skipping of a plurality of cylinders is performed by a deactivation or an activation of the fuel supply of said cylinders. Especially through the use of at least one port injection nozzle for each cylinder as fuel supply for said cylinders a very quick deactivation or activation can be achieved.

It can be particular be provided that the genset comprises a brake, by which the internal combustion engine can directly or indirectly be braked, wherein a control intervention for a control of the mechanical power output of the internal combustion engine using the control law is carried out by an activation or deactivation of the brake. In this way the internal combustion engine can be braked if the deviation of the kinematic parameter from the electrical parameter increases too much or the brake can be released if the deviation of the kinematic parameter from the electrical parameter decreases.

In a particularly preferred embodiment it can be provided that the genset comprises an auxiliary drive, by which the internal combustion engine can directly or indirectly be accelerated, wherein a control intervention for a control of the mechanical power output of the internal combustion engine using the control law is carried out by an activation or deactivation of the auxiliary drive.

Accordingly, control interventions for controlling the mechanical power output of the internal combustion engine can affect the internal combustion engine directly (for example by skip firing cylinders) or indirectly (for example by a brake and/or an auxiliary drive).

In a preferred embodiment of the invention it can be provided that the deviation of the kinematic parameter from the electrical parameter is expressed as
- a difference between the kinematic parameter and the electrical parameter and/or
- a time-integrated difference between the kinematic parameter and the electrical parameter.

It can be provided that the kinematic parameter characteristic for the rotation of the rotor of the generator is a rotational frequency, a rotational speed or a rotational angle of the shaft of the generator.

It can be provided that the electrical parameter is an electrical frequency or an electrical angle of the power supply network.

It can in particular be provided that a deviation angle between the electrical angle and the mechanical angle is used as the deviation of the kinematic parameter from the electrical parameter. Therefore it can be provided that if the deviation angle is greater than a predetermined threshold value a control intervention is performed.

Protection is also sought for a genset comprising
- an internal combustion engine and a generator, wherein the internal combustion engine is configured to drive the generator by a shaft and wherein the generator can be connected to a power supply network and can deliver electrical power to the power supply network,
- at least one first sensor for detecting a kinematic parameter characteristic for a rotation of the rotor of the generator,
- at least one second sensor for detecting an electrical parameter characteristic for a frequency and/or a phase of the power supply network and
- at least one control unit, which is configured to receive detection signals from the first and second sensor and to control a mechanical power output of the internal combustion engine with a control law including a deviation of the kinematic parameter from the electrical parameter before or during a connecting of the generator to the power supply network, wherein starting to fire a plurality—preferably all—of previously unfired cylinders and/or stopping to fire a plurality—preferably all—previously fired cylinders, is used as a control intervention for the control of the mechanical power output of the internal combustion engine.

Figure 2:
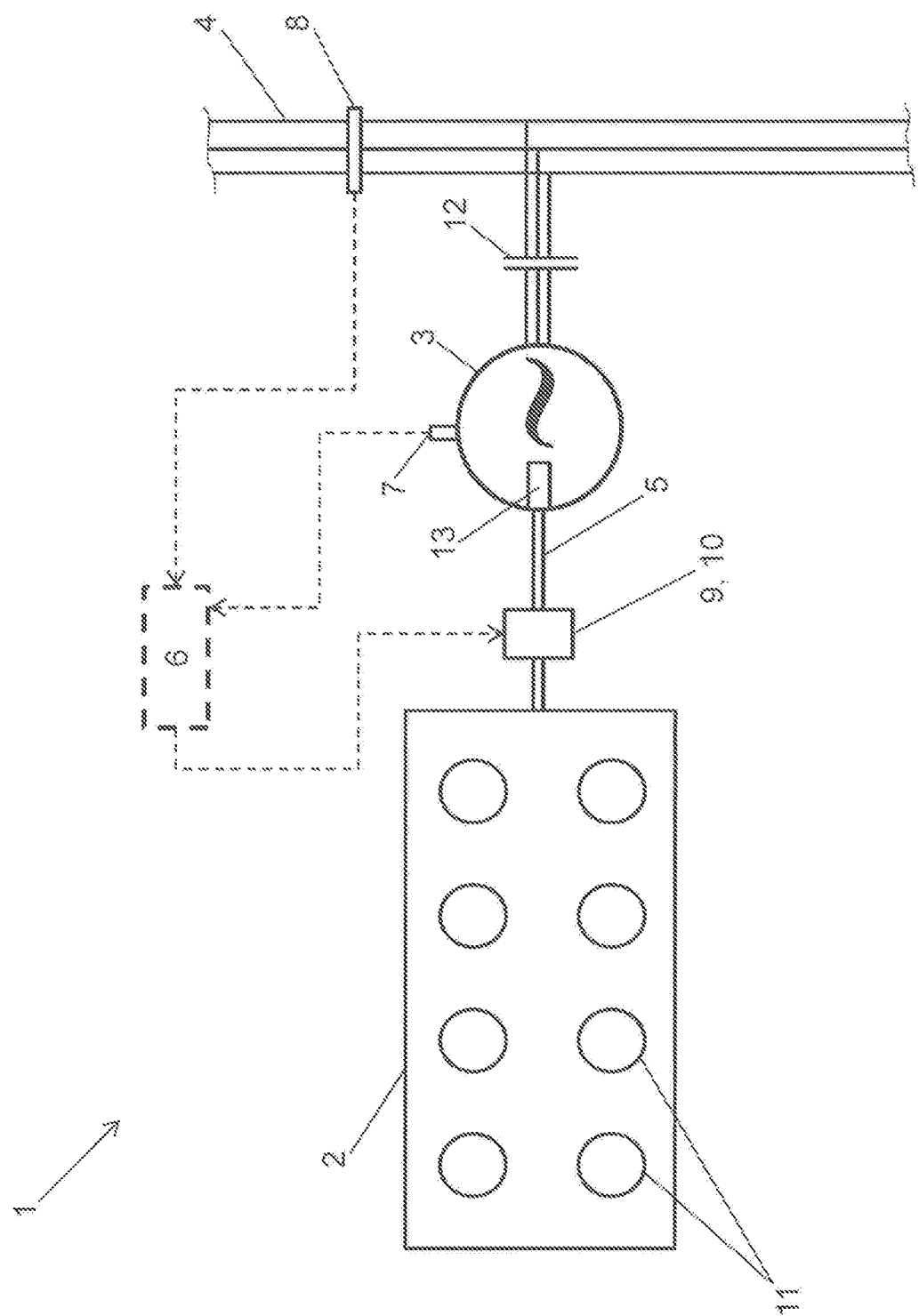

Further details and advantages of the present invention will be described with reference to the specific description hereinafter. In the drawing:

FIG. 1 shows a first embodiment of a genset, and
FIG. 2 shows second embodiment of a genset.

FIG. 1 shows a first embodiment for operating a genset 1 according to the invention. The genset 1 comprises an internal combustion engine 2 which drives a generator 3 by a shaft 5, wherein the generator 5 supplies power to a power supply network 4, wherein the genset 1, in more detail the generator 3 can be connected or disconnected by an connecting device 12 to the power supply network 4. Further a first sensor 7 is provided detecting a kinematic parameter characteristic for a rotation of generator 3 and a second sensor 8 is provided for detecting an electrical parameter characteristic for a frequency and/or a phase of the power supply network 4. This kinematic parameter detected by the first sensor 7 and this electrical parameter detected by second sensor 8 can transmitted to a control unit 6 (represented by a dashed line) by the use of signal leading connections (also shown by dotted lines) between the first sensor 7, the second sensor 8 and the control unit 6. It can be provided that the first sensor 7 is a sensor detecting a characteristic parameter for the rotational speed of the generator 3 or a rotational frequency of the generator 3 or a rotational angle of the generator 3 or a combination thereof. It also can be provided that the second sensor 8 is a sensor detecting a characteristic parameter for an electrical frequency of the power supply network 4.

With the help of the control unit 6 the kinematic parameter detected by the first sensor 7 and the electrical parameter 8 can by analyzed and a control signal can be delivered to the internal combustion engine 2 from the control unit 6 using a signal leading connection (shown with a dotted arrow). The kinematic and the electrical parameter can be analyzed in such a way that the control unit 6 observes a deviation of these parameters. This deviation can be calculated by the control unit 6 for example using a stored relation. Further it is possible that the control unit 6 triggers a control intervention at the internal combustion engine 2 for controlling the mechanical power output of the internal combustion engine 2 if the deviation of the kinematic parameters and the electrical parameter reaches or exceeds a predetermined threshold value. This predetermined threshold value can for example be an upper and a lower limit for the deviation of the kinematic parameters and the electrical parameter or a range, wherein the control unit 6 would trigger a control intervention if the deviation of the kinematic parameters and the electrical parameter would exceed the range or would cross the limits of the range. The control unit 6 can be provided as an autonomous unit which could be connected with a control unit of the internal combustion engine 2 or can be integrated into the control unit of the internal combustion engine 2. In this control scheme, where a deviation of the kinematic parameters and the electrical parameter is observed and a control intervention is provided for the internal combustion engine 2 if a change of the deviation is recognized can be concretely implement through a control low for example for calculating an amount of skipped or fired cylinders.

Such a control intervention performed at the internal combustion engine 2 can for example be a command for starting to fire a plurality—preferably all—of previously unfired cylinders 11 or a command for stopping to fire a plurality—preferably all—of previously fired cylinders 11. This can be implemented at the internal combustion engine 2 by deactivating or activating the ignition or the fuel supply of said cylinders 11. If the internal combustion engine 2 has a port injection system for cylinders 11 a deactivation or an activation of the fuel supply can have a very fast result, in terms of a reaction time of the control intervention.

But it is also possible that the control intervention is performed through a controlling of a brake 9 or an auxiliary drive 10 as shown by FIG. 2. This FIG. 2 shows a second embodiment of a genset 1 according to the invention. The embodiment of FIG. 2 substantially corresponds to the embodiment of FIG. 1 except that the control intervention of the control unit 2 is not performed at the internal combustion engine 2 itself. In the embodiment of FIG. 2 a brake 9 and/or an auxiliary drive 10 is provided at the shaft 4, which shaft 4 is provided for driving the generator 2. If a logic of the control unit 6 determines that the power output of the internal combustion engine 2 has to be reduced—if for example the deviation between the kinematic parameters and the electrical parameter increases too much—the brake 9 can be activated or an auxiliary drive 10 can be deactivated or its mechanical power output can be reduced directly. On the other hand, if the logic of the control unit 6 determines that the mechanical power output of the internal combustion engine 3 has to be increased—if for example the deviation between the kinematic parameters and the electrical parameter decreases too much—the brake 9 can be deactivated or an auxiliary drive 10 can be activated or its mechanical power output can be raised directly.

LIST OF USED REFERENCE SIGNS 1. genset
2. internal combustion engine
3. generator
4. power supply network
5. shaft
6. control unit
7. first sensor for detecting a kinematic parameter
8. second sensor for detecting an electrical parameter
9. brake
10. auxiliary drive
11. cylinders of the internal combustion engine
12. connecting device
13. rotor

The invention claimed is:

1. A system, comprising:
a controller configured to execute a control intervention to control an internal combustion engine coupled to a generator in response to a deviation between kinematic and electrical parameter characteristics before or during a connection of the generator to a power supply network, wherein the kinematic parameter characteristic relates to a rotation of a rotor of the generator, wherein the electrical parameter characteristic relates to a frequency and/or a phase of the power supply network, wherein the control intervention comprises starting to fire one or more previously unfired cylinders of a plurality of cylinders of the internal combustion engine and/or stopping to fire one or more previously fired cylinders of the plurality of cylinders of the internal combustion engine, wherein the control intervention determines a number of skipped cylinders or a number of fired cylinders depending on a magnitude of the deviation, wherein the control intervention uses the number of skipped cylinders when stopping to fire the one or more previously fired cylinders, and wherein the control intervention uses the number of fired cylinders when starting to fire the one or more previously unfired cylinders.

2. The system of claim 1, wherein the kinematic parameter characteristic comprises a rotational frequency, a rotational speed, or a rotational angle of the rotor of the generator.

3. The system of claim 1, wherein the electrical parameter characteristic comprises an electrical frequency or an electrical angle of the power supply network.

4. The system of claim 1, wherein the deviation comprises a difference between the kinematic parameter characteristic and the electrical parameter characteristic and/or a time-integrated difference between the kinematic parameter characteristic and the electrical parameter characteristic.

5. The system of claim 1, wherein the deviation comprises a deviation angle between an electrical angle of the power supply network and a rotational angle of the rotor of the generator.

6. The system of claim 1, wherein the controller is configured to select the control intervention from a plurality of selections, comprising:

(A) the control intervention comprising the starting to fire comprises activating an ignition to start firing the one or more previously unfired cylinders and/or the control intervention comprising the stopping to fire comprises deactivating the ignition to stop firing the one or more previously fired cylinders;

(B) the control intervention comprising the starting to fire comprises activating a fuel supply to start firing the one or more previously unfired cylinders and/or the control intervention comprising the stopping to fire comprises deactivating the fuel supply to stop firing the one or more previously fired cylinders;

(C) the control intervention comprises activating or deactivating a brake configured to brake the internal combustion engine; and (D) the control intervention comprises activating or deactivating an auxiliary drive configured to accelerate the internal combustion engine.

7. The system of claim 1, wherein the control intervention determines the number of skipped cylinders to be equal to the number of previously fired cylinders or the number of fired cylinders to be equal to the number of previously unfired cylinders.

8. The system of claim 1, wherein the control intervention comprising the starting to fire comprises activating an ignition to start firing the one or more previously unfired cylinders or the control intervention comprising the stopping to fire comprises deactivating the ignition to stop firing the one or more previously fired cylinders.

9. The system of claim 1, wherein the control intervention comprising the starting to fire comprises activating a fuel supply to start firing the one or more previously unfired cylinders or the control intervention comprising the stopping to fire comprises deactivating the fuel supply to stop firing the one or more previously fired cylinders.

10. The system of claim 1, wherein the control intervention comprises activating or deactivating a brake configured to brake the internal combustion engine.

11. The system of claim 1, wherein the control intervention comprises activating or deactivating an auxiliary drive configured to accelerate the internal combustion engine.

12. The system of claim 1, comprising a first sensor configured to detect the kinematic parameter characteristic and a second sensor configured to detect the electrical parameter characteristic.

13. The system of claim 1, comprising the internal combustion engine.

14. The system of claim 1, comprising the generator.

15. The system of claim 1, comprising at least a portion of the power supply network.

16. A system, comprising:
an internal combustion engine comprising a plurality of cylinders; a generator coupled to the internal combustion engine;
a first sensor configured to detect a kinematic parameter characteristic relating to a rotation of a rotor of the generator;
a second sensor configured to detect an electrical parameter characteristic relating to a frequency and/or a phase of a power supply network; and
a controller configured to execute a control intervention to control the internal combustion engine coupled to the generator in response to a deviation between the kinematic and electrical parameter characteristics before or during a connection of the generator to the power supply network, wherein the control intervention comprises starting to fire one or more previously unfired cylinders of the plurality of cylinders of the internal combustion engine and/or stopping to fire one or more previously fired cylinders of the plurality of cylinders of the internal combustion engine, wherein the control intervention determines a number of skipped cylinders or a number of fired cylinders depending on a magnitude of the deviation, wherein the control intervention uses the number of skipped cylinders when stopping to fire the one or more previously fired cylinders, and wherein the control intervention uses the number of fired cylinders when starting to fire the one or more previously unfired cylinders.

17. The system of claim 16, further comprising one or more of:
   (A) the control intervention comprising the starting to fire comprises activating an ignition to start firing the one or more previously unfired cylinders and/or the control intervention comprising the stopping to fire comprises deactivating the ignition to stop firing the one or more previously fired cylinders; or
   (B) the control intervention comprising the starting to fire comprises activating a fuel supply to start firing the one or more previously unfired cylinders and/or the control intervention comprising the stopping to fire comprises deactivating the fuel supply to stop firing the one or more previously fired cylinders; or
   (C) the control intervention comprises activating or deactivating a brake configured to brake the internal combustion engine; or
   (D) the control intervention comprises activating or deactivating an auxiliary drive configured to accelerate the internal combustion engine.

18. A method, comprising:
controlling an internal combustion engine coupled to a generator, via execution of a control intervention on a controller, in response to a deviation between kinematic and electrical parameter characteristics before or during a connection of the generator to a power supply network, wherein the kinematic parameter characteristic relates to a rotation of a rotor of the generator, wherein the electrical parameter characteristic relates to a frequency and/or a phase of the power supply network, wherein the control intervention comprises starting to fire one or more previously unfired cylinders of a plurality of cylinders of the internal combustion engine and/or stopping to fire one or more previously fired cylinders of the plurality of cylinders of the internal combustion engine, wherein the control intervention determines a number of skipped cylinders or a number of fired cylinders depending on a magnitude of the deviation, wherein the control intervention uses the number of skipped cylinders when stopping to fire the one or more previously fired cylinders, and wherein the control intervention uses the number of fired cylinders when starting to fire the one or more previously unfired cylinders.

19. The method of claim 18, further comprising one or more of:
   (A) the control intervention comprising the starting to fire comprises activating an ignition to start firing the one or more previously unfired cylinders and/or the control intervention comprising the stopping to fire comprises deactivating the ignition to stop firing the one or more previously fired cylinders; or
   (B) the control intervention comprising the starting to fire comprises activating a fuel supply to start firing the one or more previously unfired cylinders and/or the control intervention comprising the stopping to fire comprises deactivating the fuel supply to stop firing the one or more previously fired cylinders; or
   (C) the control intervention comprises activating or deactivating a brake configured to brake the internal combustion engine; or
   (D) the control intervention comprises activating or deactivating an auxiliary drive configured to accelerate the internal combustion engine.

20. The method of claim 18, comprising detecting the kinematic and electrical parameter characteristics, wherein the kinematic parameter characteristic comprises a rotational frequency, a rotational speed, or a rotational angle of the rotor of the generator, wherein the electrical parameter characteristic comprises an electrical frequency or an electrical angle of the power supply network.

* * * * *